Figure 1:
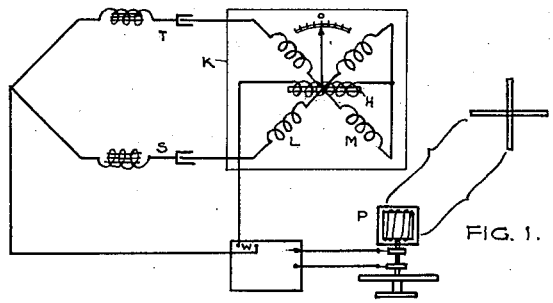

Aug. 22, 1933.   H. DIAMOND ET AL   1,923,920
COURSE SHIFT INDICATOR FOR THE DOUBLE MODULATION TYPE RADIOBEACONS
Filed July 6, 1931   2 Sheets-Sheet 1

Aug. 22, 1933.                H. DIAMOND ET AL                    1,923,920
        COURSE SHIFT INDICATOR FOR THE DOUBLE MODULATION TYPE RADIOBEACONS
                        Filed July 6, 1931         2 Sheets-Sheet 2

Inventors
Harry Diamond and
Francis W. Dunmore

By J. J. Mothershead
                Attorney

Patented Aug. 22, 1933

1,923,920

UNITED STATES PATENT OFFICE 1,923,920

COURSE SHIFT-INDICATOR FOR THE DOUBLE-MODULATION TYPE RADIO-BEACONS

Harry Diamond and Francis W. Dunmore, Washington, D. C., assignors to the Government of the United States Application July 6, 1931. Serial No. 548,966

3 Claims. (Cl. 250—11)

(Granted under the Act of March 3, 1883, as amended April 30, 1928; 370 O. G. 757)

The invention described herein may be manufactured and used by or for the Government of the United States for governmental purposes without the payment to us of any royalty thereon.

The object of our invention is to further increase the reliability of the visual directive radiobeacon system developed at the Bureau of Standards by providing an indicating instrument developed primarily for station use which serves a twofold purpose—(1) to indicate to a station operator whether a given course as laid out in space remains unvarying during a given time of operation, and (2) to serve as a check on the beacon calibration.

A brief description of the directive radiobeacon is essential to a clear understanding of the operation of the course-shift indicator. The directive radiobeacon consists essentially of a master oscillator supplying power at 290 kc. to two power amplifiers which, in turn, feed two loop antennas crossed at an angle of 90° with each other. Each power amplifier is modulated to a selected low-frequency note, the two modulating frequencies chosen being 65 and 85 cycles per second. One loop antenna, therefore, radiates a 290 kc. wave modulated to 65 cycles while the other emits a 290 kc. wave modulated to 85 cycles. Due to the directive properties of the loop antennas, these waves are a maximum in the directions of the planes of the antennas transmitting them and of zero value in the directions perpendicular to these planes. An airplane flying along a line bisecting the angle between the two antennas will, therefore, receive the two waves with equal intensity. If the airplane deviates in either direction from this line, the signal from one antenna becomes stronger and the other weaker. Equality of received signals thus indicates a fixed line or "course" in space and provides a means for guiding aircraft along that "course". For the purpose of orienting the course in any given direction a 4-coil goniometer, consisting of two stator coils crossed at an an angle of 90° with each other, and two rotor coils also crossed at 90°, is employed. The stator coils are connected to the plates of the power amplifiers while the rotor coils are connected each in series with one loop antenna.

A more detailed description may be found in a paper on Radio aid to air navigation, by J. H. Dellinger and H. Pratt, Proc. I. R. E., 16, pp. 890—920; July, 1928.

Other papers dealing with the details of the beacon system are: Receiving sets for aircraft beacon and telephony, by H. Pratt and H. Diamond, B. S. Jour. Research (RP19), October, 1928; and Design of tuned-reed course indicators for aircraft radiobeacon, by F. W. Dunmore, B. S. Jour. Research (RP28), November, 1928.

The currents in these antennas, due to the driving voltage of one stator goniometer coil, create a resultant field corresponding to that which would be produced by an imaginary or phantom loop rotating with the goniometer rotor and carrying only one modulation frequency. Since there are two primary or stator coils, two such phantom loops, one for each modulation frequency, rotating as the two movable goniometer coils rotate together, allow the equisignal zone or "course" in space to be oriented in any direction. For any given course setting, then, each loop antenna carries radio-frequency current modulated at both 65 and 85 cycles per second, the ratio of 65 to 85 cycle modulated radio-frequency power in each loop depending upon the position of the goniometer. A change in the proportion of 65 to 85 cycle modulation constitutes a change in course.

The course-shift indicator is a direct-reading switchboard type instrument designed to indicate a change in the relative amounts of 65 and 85 cycle modulation in the two antennas and, in consequence, a shifting of the course.

Figures 1, 2, 3:
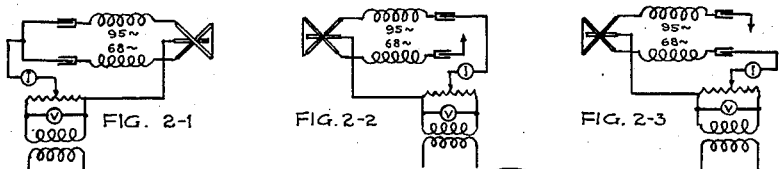
Figure 2:
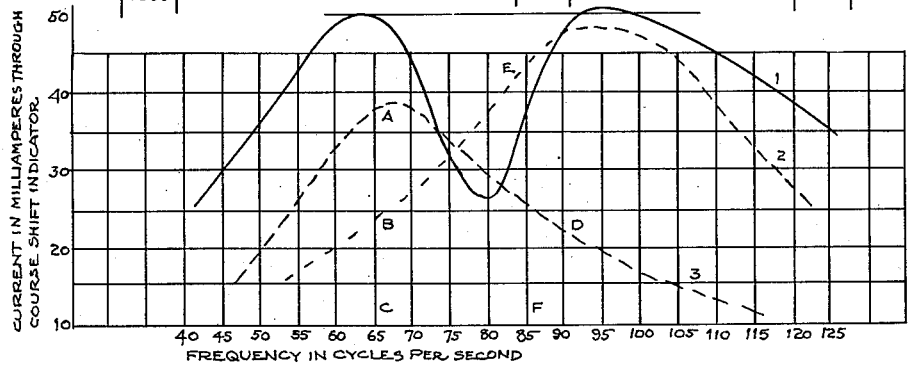
Figure 3:
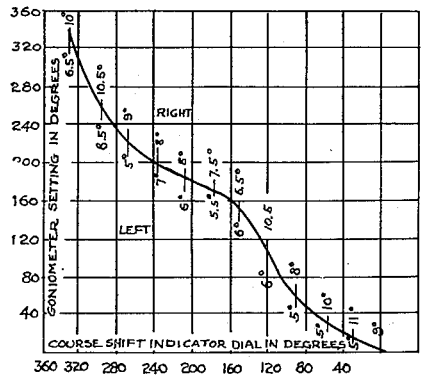
Figure 4:
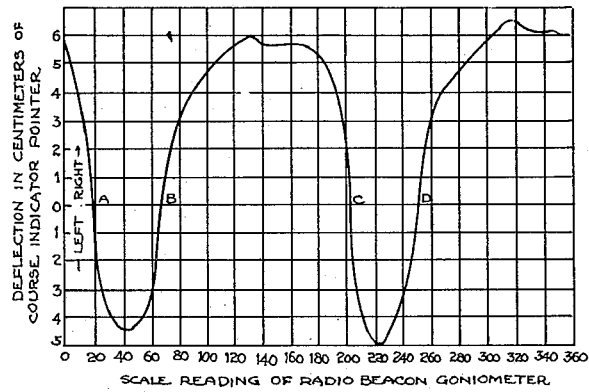
Figure 5:
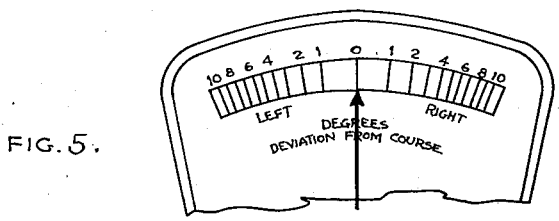

For a detailed description of our invention reference will be made to the accompanying drawings in which Figure 1 is a diagrammatic illustration of a circuit used with a course-shift indicator, Figure 2 illustrates resonance curves of course-shift indicator circuits shown diagrammatically in Figures 2—1, 2—2, and 2—3, Figure 3 ilustrates a calibration curve for a course-shift indicator, Figure 4 illustrates the scale readings of a course-shift indicator installed on an airplane as the airplane circles 360° around the beacon, and Figure 5 illustrates the scale of a course-shift indicator calibrated in degrees deviation from course.

The circuit arrangement used in applying the course-shift indicating instrument at the beacon station is shown in Figure 1. A rotating inductance coil P is coupled magnetically to both loop antennas, electrostatic coupling being prevented by means of the electrostatic shield shown. Exact equality of magnetic coupling to the two antennas is not essential. The terminals of coil P are connected to the input terminals of a detector-amplifier unit consisting of a grid bias detector and two stages of amplification, the final stage comprising two 5-watt tubes in push pull in order to provide ample power output to the course-shift instrument.

The course-shift indicating instrument is a modification of a commercial horizontal-edge switchboard type of frequency meter having an external reactor box. The meter consists of two field coils, L and M, and an armature or rotor coil, H. A pointer attached to the rotor coil moves over a suitable scale. The force actions of the two field coils upon the rotor coil are in opposition, so that with equal currents in the two field coils the pointer assumes a mid-scale position. The reactor box contains two filters, S and T, having constants such that with equal 65 and 85 cycle voltages impressed upon the instrument equal currents flow through the field coils L and M. If the 65-cycle voltage becomes greater than the 85-cycle voltage, the field coil L carries a greater current than M, while if the 65-cycle voltage is smaller, the reverse is true. The differential force action of the fields L and M upon the armature H, therefore, serves directly as a means for comparing the relative amount of 65 and 85 cycle modulation in the radio-frequency voltage induced in the coupling coil P. The resonance curves of the tuned circuits employed are given in Figure 2. The three curves shown are to be associated with the respective circuits given in the figure. The theory of operation of the instrument may now be given in somewhat greater detail.

With a voltage of 65 cycles frequency impressed upon the instrument terminals, the circuit SLHW which is tuned to 68 cycles, carries a 65-cycle current whose value may be designated as $\overline{AC}$, while the circuit TMHW, tuned to 95 cycles, carries a 65-cycle current of value $\overline{BC}$. Similarly, with an equal voltage of 85 cycles frequency impressed, the circuit SLHW carries an 85-cycle current of value $\overline{DF}$ while the circuit TMHW carries an 85-cycle current of value $\overline{EF}$.

With both signals impressed simultaneously, field coil L carries currents $\overline{AC}$ and $\overline{DF}$, while field coil M carries currents $\overline{BC}$ and $\overline{EF}$. The rotor coil H is the return path for all these circuits. The components of the force action of the field coil L upon the rotor coil H are then proportional to $$\overline{AC} \times \overline{AC} + \overline{AC} \times \overline{BC} + \overline{DF} \times \overline{DF} + \overline{DF} \times \overline{EF} \quad (1)$$

while the components of the force action of the field coil M upon the rotor coil H are proportional to $$\overline{BC} \times \overline{AC} + \overline{BC} \times \overline{BC} + \overline{EF} \times \overline{DF} + \overline{EF} \times \overline{EF} \quad (2)$$

The net force action is then proportional to the difference between (1) and (2), or to $$(\overline{AC} \times \overline{AC} + \overline{DF} \times \overline{DF}) - (\overline{BC} \times \overline{BC} + \overline{EF} \times \overline{EF}) \quad (3)$$

Obviously, the first half of (3) should be made equal to the second half if the pointer is to be at mid-scale when equal 65 and 85 cycle voltages are impressed.

Assume now that the 65-cycle voltage increases while the 85 cycle decreases. The currents $\overline{AC}$ and $\overline{BC}$ are proportionately increased and the currents $\overline{DF}$ and $\overline{EF}$ are reduced. The first half of (3) thus becomes greater than the second half and the net force action upon the rotor coil becomes greater than zero, the coil and the pointer moving toward the left. The reverse is true if the 85 cycle voltage increases while the 65-cycle voltage decreases. The sensitivity of the course-indicating instrument may be considerably increased if sharper tuning of the circuits SLHW and TMHW can be obtained. The greater selective effects on the modulation frequencies thereby secured amplifies the difference in currents in the stator fields and accordingly the difference in force exerted by these fields on the rotor. For example, in the first case considered (the 65-cycle voltage increasing and the 85-cycle decreasing), the current $\overline{DF}$ decreases as $\overline{AC}$ increases, while the current $\overline{BC}$ increases and $\overline{EF}$ decreases. Obviously, the difference between the first and second halves of (3) would be greater if $\overline{BC}$ and $\overline{DF}$ were of smaller magnitudes.

The application of the course-shift instrument at the beacon station may now be shown. With the goniometer on a given course setting, radio-frequency voltages modulated to 65 and 85 cycles per second are induced in the coil P (Fig. 1), the relative amplitudes induced being dependent upon the relative proportion of 65 to 85 cycles modulation in the two loop antennas and also upon the relative coupling of the coil, P, with these antennas. It is simpler and equivalent to deal with the two phantom loops crossed at 90° set up by the beacon as described above, one phantom loop carrying only current modulated to 65 cycles per second and the other phantom loop only current modulated to 85 cycles per second, the position of the phantom loops being a function of the goniometer setting. By rotating the coupling coil, P, a position is found where the magnetic coupling to the two phantom loops is equal. At this setting the pointer of the course shift indicator will be at mid scale, or zero. If the phantom loops are now shifted in position, either by a change of the goniometer setting or by a change in the percentages of 65 and 85 cycle modulation in the two physical loops due to circuit changes in the beacon, the equality of coupling of the coil, P, to the two phantom loops is no longer maintained and the instrument pointer deflects either to the left or right of zero. A 1° shift of the phantom loops, corresponding to a 1° change in the goniometer setting, results in a deflection of the instrument pointer of approximately 1 cm.

The twofold application of the course-shift indicator at the beacon station is now evident. Suppose that the goniometer is set on a given beacon course and the coupling coil rotated to adjust the course-shift indicator pointer to zero. A station attendant is then certain that the course marked out in space remains unvarying so long as the instrument pointer remains at zero. As noted above, a 1° shift in the course will result in a 1 cm. deflection of the instrument pointer, so that a change in the course of 0.1° may easily be detected. Easy adjustments of the radio-frequency voltage supply to the two amplifier trains of the beacon transmitting set are provided whereby a shift in the course once detected may be corrected.

To check the variations in the course during the operation of the beacon, a series of tests was made, each lasting from two to six hours. At no time was a deflection greater than 0.5 cm. observed, the maximum deflections usually occurring during the warming up of the beacon transmitting set. Moreover, the shifts were as much on one side of zero as on the other. It is conceivable, however, that over a long period of operation difference in tube aging, etc., may introduce a permanent shift in the course.

The second application of the instrument described lies in the ability to recalibrate the beacon in very simple fashion with its aid, once the beacon has been properly calibrated. The usual procedure in calibrating the beacon consists of orienting the course on a given point and checking the course at a distance to insure that it has been properly oriented. This is repeated for a number of points of diverse geographical location. The calibration obviously involves a considerable amount of time and effort and should be repeated at definite intervals.

If, during the original calibration of the beacon, the settings of the scale attached to coupling coil P (at which the course-shift indicator reads zero), corresponding to the various goniometer settings are recorded, the beacon is calibrated once for all. A curve showing the calibration of the course-shift indicator-coil position in terms of the goniometer-rotor angles is given in Figure 3. So long as this calibration remains true, the beacon calibration is also correct. The points of the entire curve of Figure 3 may be checked in a very short time.

The peculiar shape of this curve is due to the unsymmetrical location of the coil P with respect to the two loop antennæ. With a perfectly symmetrical arrangement, a straight line would be obtained. The figures on the curve indicate the degrees of rotation of the goniometer necessary to throw the course-shift indicator needle off scale either to the right or left and thus serve as a measure of the sharpness of indication of this instrument at each point. Since the instrument scale measures approximately 13 cm over all, the sensitivity of the instrument is seen to range from 0.7 to 1 cm per degree shift of the course, depending upon the setting of the coupling coil P.

From the description of operation of the course-shift indicator it is evident that it may also be used as a course indicator on shipboard or on aircraft. To accomplish this it is only necessary to receive the double-modulation radio beacon signals with amplitude sufficient to properly operate the instrument. The operating voltage necessary is of the order of magnitude which may be obtained from the output of a well-designed receiving set.

In order to prove the usefulness of this instrument as a visual course indicator, tests were made with it at a distance of 12 miles from the radio beacon. The results obtained are given in the curve of Figure 4, which plots the deflections of the instrument pointer in centimeters to the right or left of zero, as the beacon course was oriented through 360°. The effect is identical with that obtained if an airplane carrying the instrument circled around the beacon maintaining a constant distance of 12 miles. The curve indicates that there are four courses, A, B, C, and D, which may be used, two of which, A and C, are sharper than the other two, B and D, as evidenced by the slope of the curve at these points. This is in accordance with results obtained with the vibrating-reed course indicator. A course may here be defined as the locus of the positions in space at which the instrument receives equal signals from the phantom loops set up by the beacon, the instrument pointer being then at mid-scale or zero setting.

Figure 5 was prepared from the data of Figure 5, course A, and shows the instrument scale calibrated in degrees deviation from the course. A deviation of 0.1° from the course may easily be detected. For the instrument used this calibration would not be practicable unless precautions were taken to keep the instrument operating voltage of constant magnitude, since the type of coil spring used introduced a voltage error in the instrument, the degree of sharpness of indication being in part dependent upon the strength of signal impressed. This voltage error can, however, be eliminated by using a different coil-spring design.

It is interesting to compare the use of this instrument as a visual course indicator with the vibrating-reed type of indicator now employed. Its chief advantage over the reed indicator lies in the extremely sharp indication of course made possible by its use. The disadvantages are those of greater weight, greater signal strength required for operation, and greater chance of injury to moving parts. From the point of view of freedom from atmospheric disturbances or other interferences the reeds are, under constant condition of use, much preferable, since much sharper tuning may be obtained mechanically at the low modulating frequencies employed.

Having thus described our invention our claim is:

1. In a course shift indicator the combination with a receiving antenna, of a radio-frequency amplifier connected to said antenna, a detector connected to the output of said radio-frequency amplifier, an audio-frequency amplifier connected to the output terminals of said detector, said audio-frequency amplifier having two output terminals, a rotor coil carrying a pointer and connected to one output terminal of said audio-frequency amplifier, a stator coil, a second stator coil, said two stator coils being arranged at right angles with respect to each other and symmetrically-coupled to said rotor coil, one end of said stator coils being connected to the unconnected end of said rotor coil; two tuned circuits each with two output terminals each of said tuned circuits being tuned to a different audio frequency, one terminal of said tuned circuits being connected to the unconnected output terminal of said audio-frequency amplifier, and the other terminals of said tuned circuits being connected one to the unconnected end of said first stator coils and the other to the unconnected end of second said stator coil.

2. In a course shift indicator, the combination with a receiving antenna, of a detector coupled to said antenna, an amplifier coupled to said detector, two circuits tuned to different frequencies and connected to the output of said amplifier, a field coil in series with each circuit, said coils being arranged electrically at angles of ninety degrees to each other, a rotor coil in series with each of said field coils and connected to the output of said amplifier and arranged to rotate within said field coils and means for determining the position of the rotor coil with respect to the field coils.

3. The combination with a receiving antenna, of a detector coupled to said antenna, an audio frequency amplifier, a plurality of circuits tuned to different audio frequencies in circuit with said amplifying means, a field coil in series with each of said circuits, said coils being arranged electrically at right angles to each other, a rotor coil in series with each of said field coils and arranged to rotate within said field coils and means operated by the rotor coil to indicate angular movements of said coil.

HARRY DIAMOND.
FRANCIS W. DUNMORE.